(12) United States Patent  
Kato (10) Patent No.: US 9,175,986 B2
(45) Date of Patent: Nov. 3, 2015

(54) SEPARATE LINEAR ENCODER

(71) Applicant: MITUTOYO CORPORATION, Kawasaki-shi, Kanagawa (JP)

(72) Inventor: Yoshiaki Kato, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 152 days.

(21) Appl. No.: 14/173,227

(22) Filed: Feb. 5, 2014

(65) Prior Publication Data

US 2014/0217271 A1  Aug. 7, 2014

(30) Foreign Application Priority Data

Feb. 7, 2013  (JP) .................................. 2013-22735

(51) Int. Cl.
| | | |
|---|---|---|
| G01B 21/22 | (2006.01) | |
| G01D 5/347 | (2006.01) | |
| G01D 5/244 | (2006.01) | |
| G01D 18/00 | (2006.01) | |

(52) U.S. Cl.
CPC ........ G01D 5/34746 (2013.01); G01D 5/24452 (2013.01); G01D 18/00 (2013.01)

(58) Field of Classification Search
CPC ....................................... G01D 5/34

USPC ............ 250/231.1–231.18; 33/706, 707, 1 N, 33/1 PT; 341/13, 14; 356/616, 617
See application file for complete search history.

(56) References Cited

U.S. PATENT DOCUMENTS 7,359,826 B2 * 4/2008 Strasser ................. G01B 21/22
250/231.13

FOREIGN PATENT DOCUMENTS

JP  2010-048786  3/2010

* cited by examiner

*Primary Examiner* — Renee D Chavez
(74) *Attorney, Agent, or Firm* — Rankin, Hill & Clark LLP (57) ABSTRACT

In a separate linear encoder, a scale is further provided with an ABS track that is arranged in parallel with an INC track and a detection head includes an ABS detection portion that reads the ABS track. The separate linear encoder includes a calculation portion that obtains a yaw angle of the detection head with respect to a scale based on a gap between an INC detection portion and an ABS detection portion and a difference amount between a position value of the INC track, which is detected by the INC detection portion, and a position of the ABS track, which is detected by the ABS detection portion. The calculation portion also obtains a signal strength based on two-phase sine wave signals that are output from the INC detection portion. The separate linear encoder further includes a display device that displays a plurality of yaw angles and the signal strengths corresponding to the respective yaw angles.

10 Claims, 7 Drawing Sheets

SEPARATE LINEAR ENCODER

CROSS-REFERENCE TO RELATED APPLICATION

The disclosure of Japanese Patent Application No. 2013-22735 filed on Feb. 7, 2013 including specifications, drawings and claims is incorporated herein by reference in its entirety.

TECHNICAL FIELD

The present invention relates to a separate linear encoder and particularly relates to a separate linear encoder that is capable of efficiently and highly accurately adjusting a yaw angle of a detection head with respect to a scale.

BACKGROUND ART

In prior art, a separate linear encoder is known. The separate linear encoder has a scale that is provided with an incremental (INC) track (or an absolute (ABS) track), which constitutes a main track, and a detection head that includes an INC detection portion (or an ABS detecting portion), the detection head being relatively movable with respect to the scale and reads the INC track (or the ABS track). In this type of separate linear encoder, the scale and the detection head are separately provided, and both the scale and the detection head are assembled to chosen machinery or equipment such that they maintain a predetermined mutual positional relationship to each other. A signal strength from the scale is measured by an oscilloscope, and an inclination (yaw angle) of the detection head with respect to the scale (measurement axis direction) that is generated at the time of assembly is adjusted such that the amplitude is at a maximum value (Background Art described in Japanese Patent Application Laid-Open No. 2010-48786).

CITATION LIST

Patent Literature

Patent Literature 1: Japanese Patent Application Laid-Open No. 2010-48786

SUMMARY OF INVENTION

Technical Problem

However, with the method disclosed in the Background Art of Japanese Patent Application Laid-Open No. 2010-48786, it is necessary to prepare an oscilloscope for assembly. Then, with this method, it is necessary to find an optimum assembly state while only relying on the signal strength displayed on the oscilloscope, namely, to find an optimum yaw angle by randomly moving the yaw angle while visually following changes in the signal strength displayed on the oscilloscope. In this way, it is difficult to efficiently adjust the yaw angle. At the same time, as a difference between the yaw angle adjusted in the above-described manner and an actual optimum yaw angle is large, it is also difficult to achieve a highly accurate adjustment of the yaw angle.

The present invention has been made in order to solve the above-described problems in the conventional technique, and an object thereof is to provide a separate linear encoder that is capable of efficiently and highly accurately adjusting a yaw angle of a detection head with respect to a scale.

Solution to Problem

According to one aspect of the present invention, a separate linear encoder has a scale provided with a main track and a detection head including a main detection portion to read the main track, and being relatively movable to the scale. An angle detection track arranged in parallel with the main track on the scale and an auxiliary detection portion to read the angle detection track, included in the detection head. The one aspect of the present invention solves the above-described problems by having: a first calculation device to obtain a yaw angle of the detection head with respect to the scale based on a gap between the main detection portion and the auxiliary detection portion, and based on a difference amount between a position value of the main track detected by the main detection portion and a position value of the angle detection track detected by the auxiliary detection portion; a second calculation device to obtain a signal strength based on an output signal from the main detection portion; and a display device to display relationships between a plurality of yaw angles and signal strengths corresponding to the respective yaw angles.

According to another aspect of the present invention, a separate linear encoder has a scale provided with a main track and a detection head including a main detection portion to read the main track, and being relatively movable to the scale. An angle detection track arranged in parallel with the main track on the scale and an auxiliary detection portion to read the angle detection track, included in the detection head. The another aspect of the present invention solves the above-described problems by having: a first calculation device to obtain a yaw angle of the detection head with respect to the scale based on a gap between the main detection portion and the auxiliary detection portion, and based on a difference amount between a position value of the main track detected by the main detection portion and a position value of the angle detection track detected by the auxiliary detection portion; a second calculation device to obtain a signal strength based on an output signal from the main detection portion; a third calculation device to recognize the current yaw angle with respect to an optimum yaw angle at which the signal strength reaches a maximum level and calculates a guide signal that guides the current yaw angle to the optimum yaw angle; and an output device to output the guide signal.

Yet another aspect of the present invention is configured to include a fourth calculation device to calculate the optimum yaw angle based on changes in the signal strengths corresponding to the plurality of yaw angles.

Yet another aspect of the present invention is configured such that the changes in the signal strengths are obtained by fitting a function.

Yet another aspect of the present invention is configured such that the function is a multidimensional function.

Yet another aspect of the present invention is configured such that the function is a trigonometric function.

Yet another aspect of the present invention is configured to output the guide signal as a sound.

Yet another aspect of the present invention is configured to further include display device to display relationships between the plurality of yaw angles and the signal strengths corresponding to the respective yaw angles.

Yet another aspect of the present invention is configured such that the main track is an incremental (INC) track, and the angle detection track is an absolute (ABS) track.

Yet another aspect of the present invention is configured such that the main track and the angle detection track each are an incremental (INC) track.

Advantageous Effects of Invention

According to the present invention, it is possible to efficiently and highly accurately adjust a yaw angle of a detection head with respect to a scale.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described below in detail with reference to the drawings.

A first embodiment according to the present invention will be described with reference to FIG. 1 to FIG. 4.

First, a structure of a separate linear encoder 100 according to the present embodiment will be described.

Figure 1:
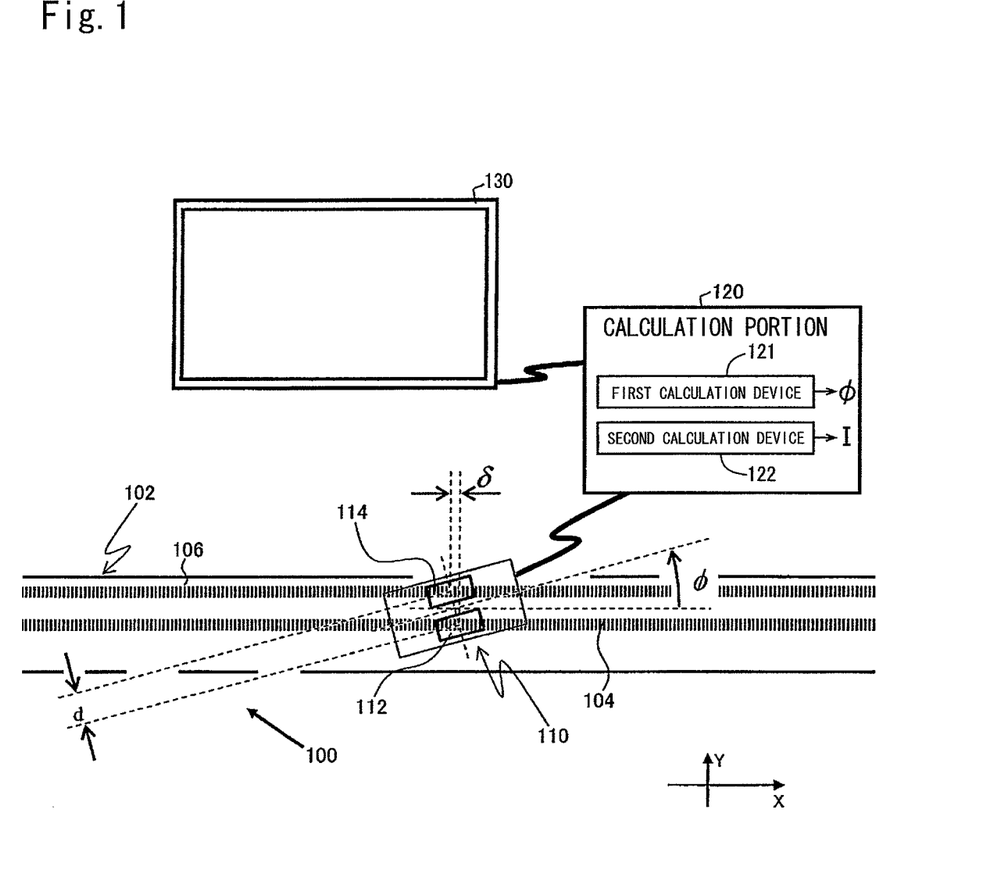
FIG. 1 is a schematic perspective view of a separate linear encoder according to a first embodiment of the present invention.

As shown in FIG. 1, the encoder 100 includes a scale 102, a detection head 110, a calculation portion 120 (first and second calculation device) and a display unit (display device) 130. The scale 102 and the detection head 110 are in a state of being separated from each other and are assembled on chosen machinery or equipment such that they maintain a predetermined mutual positional relationship to each other, in which the scale 102 and the detection head 110 are positioned closely to each other to the extent that they are brought into close contact with each other. Note that the calculation portion 120 may be housed inside the detection head 110.

The scale 102 is a reflection scale as shown in FIG. 1, for example, and is provided in the measurement axis direction with an INC track 104, which operates as a main track, and an ABS track 106, which operates as an angle detection track arranged in parallel with the INC track 104. A light and dark pattern is cyclically formed along the measurement axis direction of the INC track 104 over the entire scale 102. A light and dark pattern is irregularly formed along the measurement axis direction of the ABS track 106 over the entire scale 102 (the main track and the angle detection track may both be INC tracks or may both be ABS tracks). A gap d between the INC track 104 and the ABS track 106 is set to be identical to a gap between an INC detection portion 112, which operates as a main detection portion, and an ABS detection portion 114, which operates as an auxiliary detection portion. Both the INC detection portion 112 and the ABS detection portion 114 are described below.

As shown in FIG. 1, the detection head 110 can be relatively displaced with respect to the scale 102 in the measurement axis direction. The detection head 110 includes the INC detection portion 112 that reads the INC track 104 and the ABS detection portion 114 that reads the ABS track 106, which are integrally provided thereto. As described above, the gap between the INC detection portion 112 and the ABS detection portion 114 is set to be identical to the gap d between the INC track 104 and the ABS track 106.

As shown in FIG. 1, the calculation portion 120 can perform various calculations with respect to outputs from the INC detection portion 112 and the ABS detection portion 114. More specifically, the calculation portion 120 can obtain a position of the INC track 104 Xinc and a position of the ABS track 106 Xabs that are detected by the INC detection portion 112 and ABS detection portion 114, respectively. Then, as shown in Formula (1), as first calculation device 121, the calculation portion 120 can obtain a yaw angle φ. The yaw angle φ is an inclination of the detection head 110 with respect to (the measurement direction of) the scale 102, and obtained based on the gap d between the INC detection portion 112 and the ABS detection portion 114 and a difference amount δ between the position of the INC track 104 Xinc and the position of the ABS track 106 Xabs (=Xinc−Xabs). Note that Formula (1) can obtain the yaw angle φ accurately when φ<<1.

$$\phi = \delta/d \quad (1)$$

Figure 2:
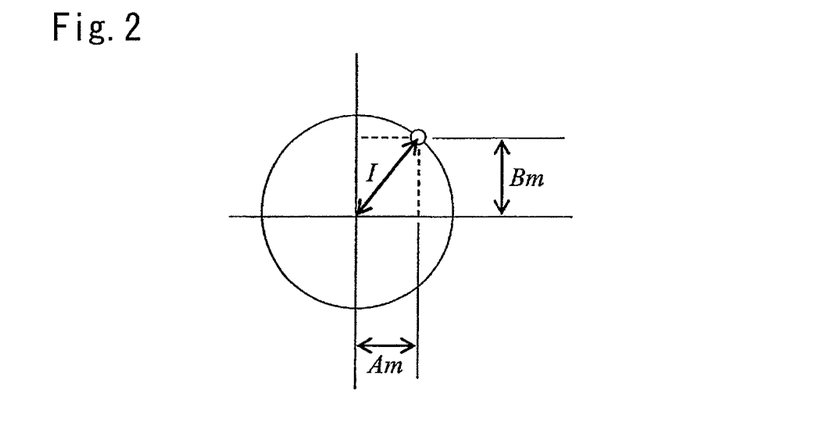
FIG. 2 is a schematic diagram showing a Lissajous figure drawn by an output signal from an INC detection portion of the separate linear encoder according to the first embodiment of the present invention.
Figure 3:
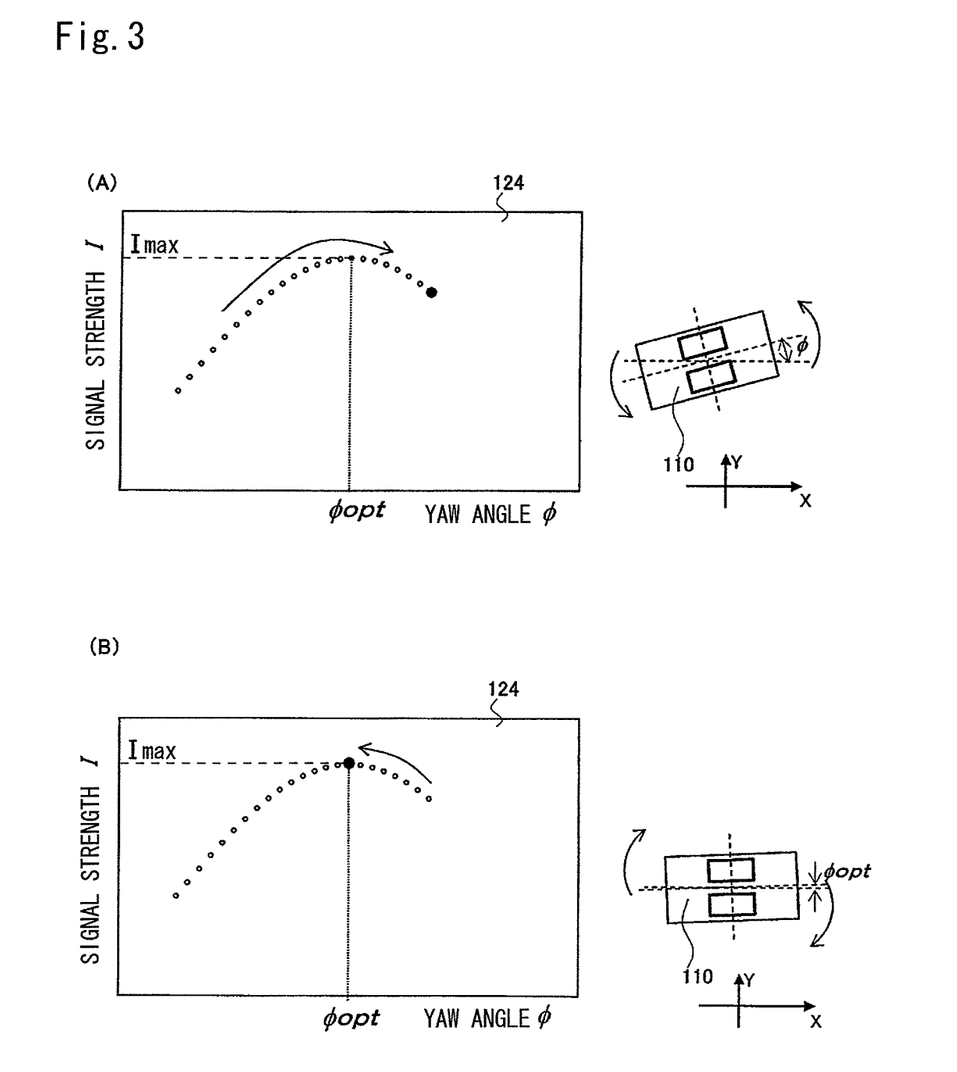
FIGS. 3A and 3B are each a schematic diagram showing a signal strength corresponding to a detection head and a yaw angle of the separate linear encoder according to the first embodiment of the present invention.

Further, as shown in Formula (2), as second calculation device 122, the calculation portion 120 can obtain a signal strength I based on two-phase sine wave signals Am and Bm that are output signals from the INC detection portion 112. Note that a relationship between the two-phase sine wave signals Am and Bm and the signal strength I can be shown as a Lissajous figure, as shown in FIG. 2. Further, the output signals are not limited to the two-phase sine wave signals Am and Bm.

$$I = (Am^2 + Bm^2)^{1/2} \quad (2)$$

The calculation portion 120 can output a relationship between the yaw angle φ and the signal strength I corresponding to the yaw angle φ, namely, a dependency of the signal strength I on the yaw angle to be displayed on the display unit 130.

As shown in FIG. 1, the display unit 130 can display an output of the calculation portion 120 as an image. More specifically, as shown in FIGS. 3A and 3B, for example, the display unit 130 sequentially displays a result output from the calculation portion 120 as a point on a coordinate having the yaw angle φ on the horizontal axis and the signal strength I on the vertical axis. In other words, the display unit 130 can display relationships between a plurality of the yaw angles φ and the signal strengths I corresponding to the respective yaw angles φ, the plurality of the yaw angles φ being output from the calculation portion 120. (In FIGS. 3A and 3B, a black circle (black point) shows the signal strength I at a present time and an outlined circle (white point) shows the signal strength I in the past up to the present time. The solid arrow shows a rotation direction of the detection head 110. The same applies to subsequent figures.) Note that the yaw angle φ that shows a maximum signal strength Imax, at which the signal strength I reaches its maximum value, is identified as an optimum yaw angle φopt, and with the optimum yaw angle φopt, the detection head 110 is in a state of substantially having no inclination with respect to the scale 102.

Figure 4:
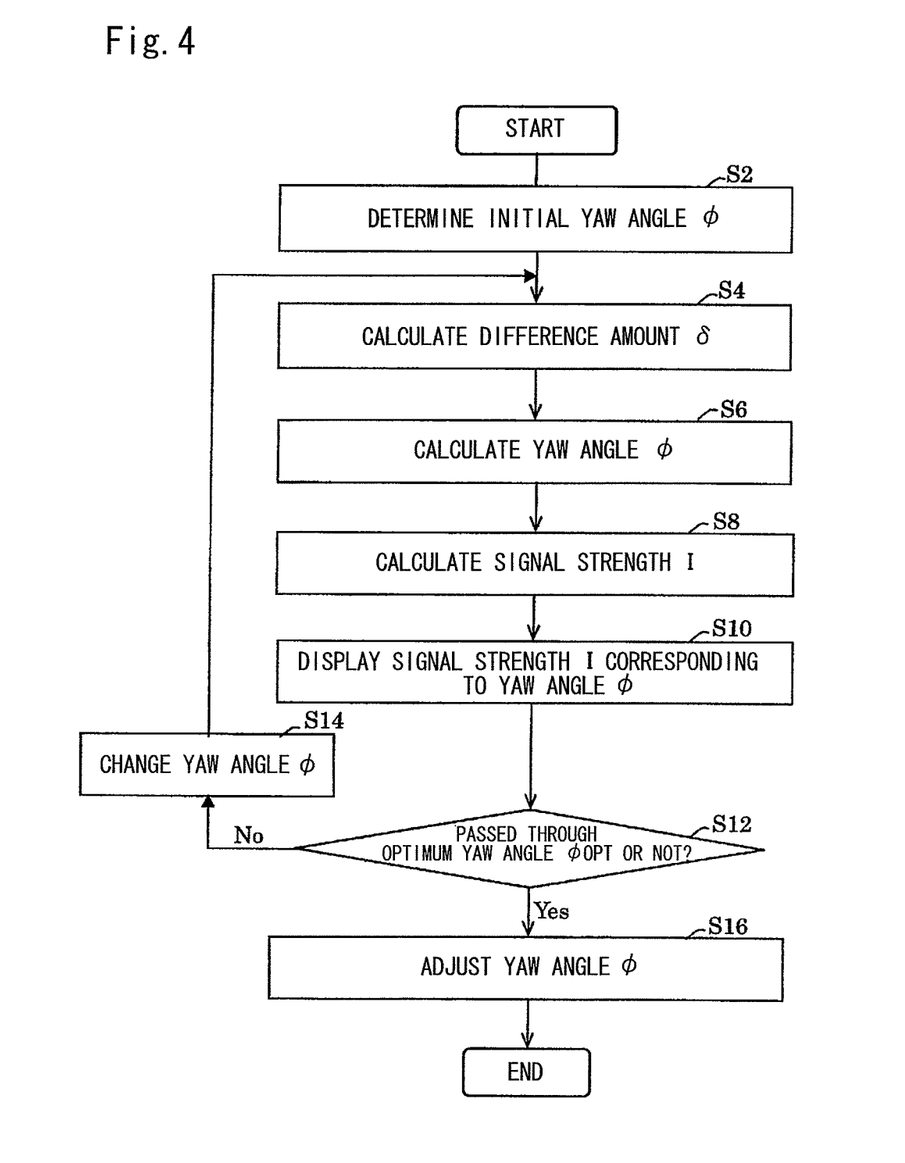
FIG. 4 is a schematic diagram showing a flow chart to explain an example of a procedure for adjusting the yaw angle of the separate linear encoder according to the first embodiment of the present invention.

Next, an example of a procedure for adjusting the yaw angle of the separate linear encoder 100 according to the present embodiment will be described below with reference to FIG. 4.

First, an initial yaw angle φ is determined (step S2) by arranging the detection head 110 in a state of being clearly inclined with respect to the scale 102. Then, based on the outputs from the INC detection portion 112 and the ABS detection portion 114 of the detection head 110, the calculation portion 120 performs a calculation to obtain the difference amount δ between the position Xinc of the INC track 104 and the position Xabs of the ABS track 106 (step S4).

Next, based on the gap d between the INC detection portion 112 and the ABS detection portion 114 and on the difference amount δ, the calculation portion 120 performs a calculation to obtain the yaw angle φ of the detection head 110 with respect to the measurement axis direction of the scale 102 (step S6). Then, the calculation portion 120 performs a calculation to obtain the signal strength I based on the two-phase sine wave signals Am and Bm that are output from the INC detection portion 112 (step S8). Then, the calculation portion 120 outputs, to the display unit 130, the relationship between the yaw angle φ and the signal strength I corresponding to the yaw angle φ.

Next, the display unit 130 displays the signal strength I corresponding to the yaw angle φ as a point (step S10). Then, a comparison between the signal strength I based on the yaw angle φ obtained this time and a signal strength Ip based on a yaw angle φp obtained a previous time is performed. If the signal strength I obtained this time is larger than the signal strength Ip obtained the previous time, it is determined that the optimum yaw angle φopt has not yet been passed (NO at step S12) and the yaw angle φ is changed (step S14) (note that if the signal strength I is obtained for the first time, as the previous signal strength Ip is 0, the processing advances to step S14). Here, a direction of the change is the same as a direction applied when the yaw angle φp of the previous time is changed to the yaw angle φ obtained this time. The direction to change the yaw angle φ is substantially a direction that makes the initial inclination of the detection head 110 become apparently smaller. Then, the processing from step S4 to step S12 is repeated. More specifically, as shown in FIG. 3A, the signal strengths I obtained up to the previous time are displayed as points on the display unit 130 by the calculation portion 120, based on the change of the yaw angle φ. By repeatedly changing the yaw angle φ in the above-described direction, the signal strength I reaches the maximum signal strength Imax, and then, the signal strength I becomes smaller than the maximum signal strength Imax. In other words, the signal strength I obtained this time becomes smaller than the signal strength Ip obtained the previous time and it is determined that the yaw angle φ has passed the optimum yaw angle φopt (YES at step S12) (a state shown in FIG. 3A).

Next, a display state of the plurality of points on the coordinates shown in FIG. 3A is checked on the display unit 130, the yaw angle φ of the detection head 110 is changed in the opposite direction, and the yaw angle φ is adjusted to the optimum yaw angle φopt, as shown in FIG. 3B (step S16). Note that, in these series of steps, the yaw angle φ is calculated using the difference between the position Xinc of the INC track 104 and the position Xabs of the ABS track 106. Therefore, even if the detection head 110 moves in the measurement axis direction while the yaw angle φ of the detection head 110 is being changed, any impact on the yaw angle φ is inhibited. In the present embodiment, step S12, step S14 and step S16 are performed by an operator.

In this manner, in the present embodiment, as the dependency of the signal strength I on the yaw angle is displayed on the display unit 130, it is possible for the operator to efficiently and accurately adjust the yaw angle φ and to shorten a time required to adjust the yaw angle φ.

More specifically, in the present embodiment, it becomes possible to efficiently and highly accurately adjust the yaw angle φ of the detection head 110 with respect to the scale 102.

Although the present invention is described above with reference to the first embodiment, the present invention is not limited to the first embodiment. More specifically, it is needless to say that modifications and design changes can be devised by those skilled in the art without departing from the spirit and the scope of the present invention.

For example, although only the relationship between the plurality of yaw angles φ and the signal strengths I corresponding to the respective yaw angles φ are displayed on the display unit 130 in the first embodiment, the present invention is not limited thereto. For example, the present invention may be configured as in a second embodiment shown in FIG. 5.

Figure 5:
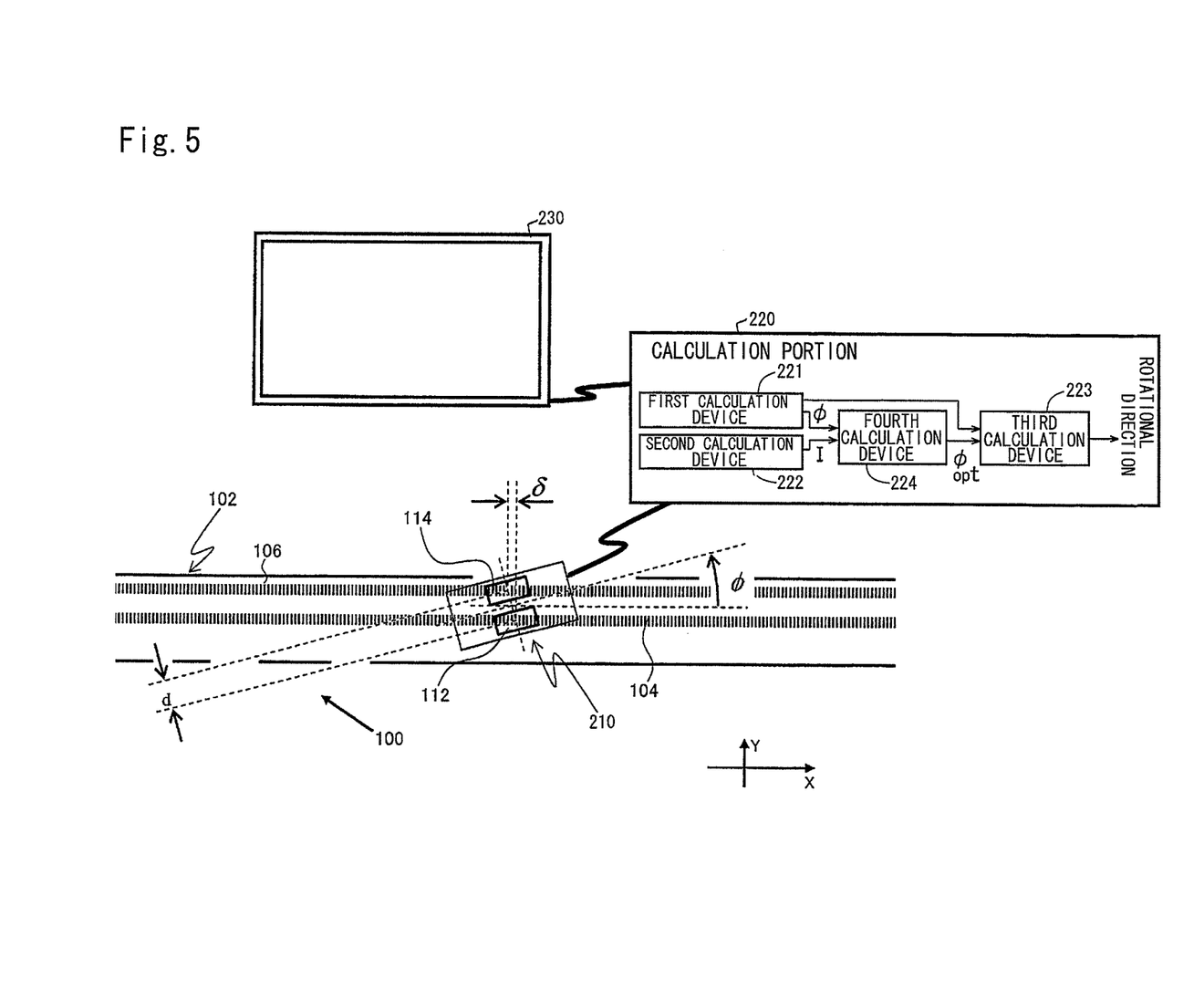
FIG. 5 is a schematic perspective view of a separate linear encoder according to a second embodiment of the present invention.
Figure 6:
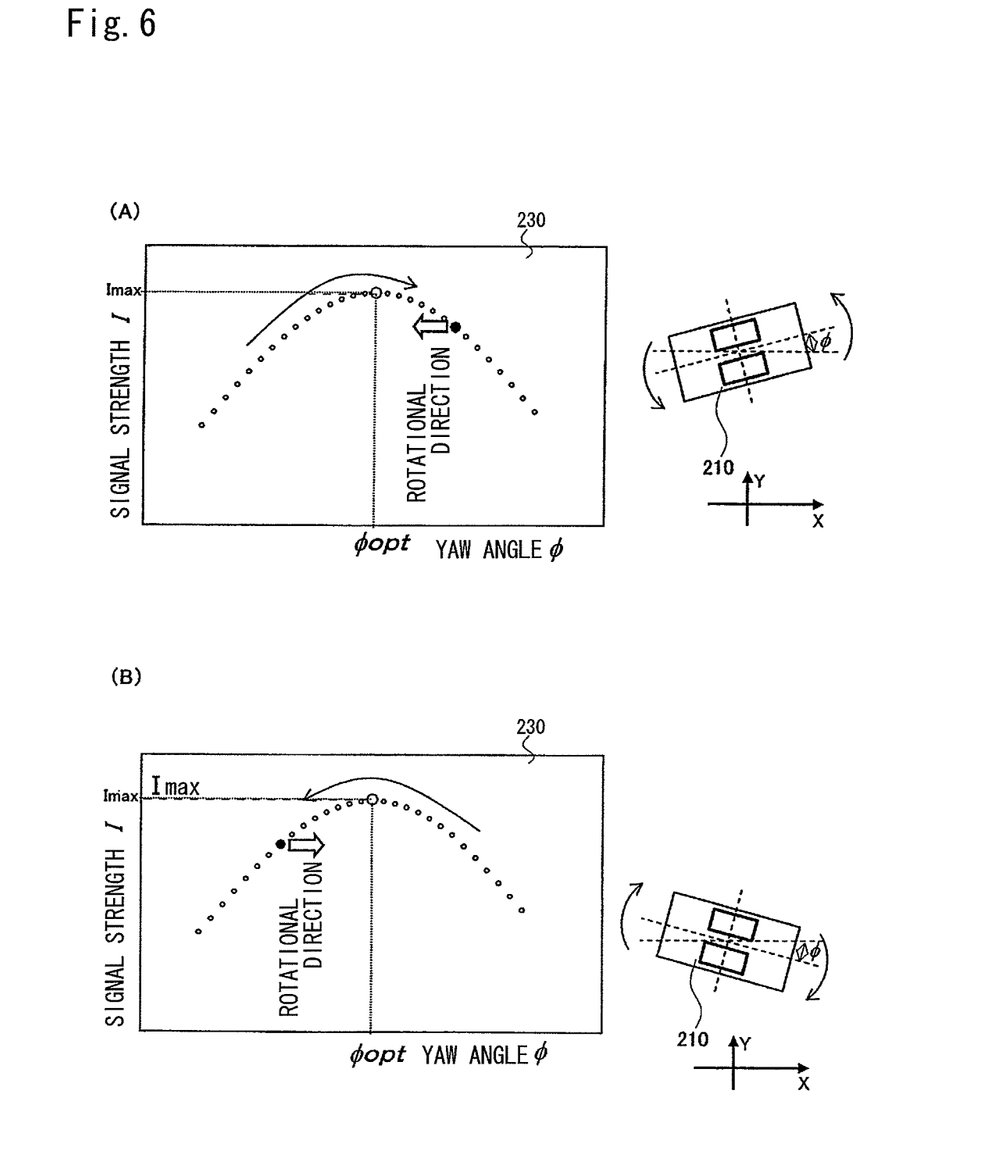
FIGS. 6A and 6B are each a schematic diagram showing a signal strength corresponding to a detection head and a yaw angle of the separate linear encoder according to the second embodiment of the present invention.

In the second embodiment, a calculation portion 220 also operates as first calculation device 221 and second calculation device 222, in the same manner as in the first embodiment. More specifically, the calculation portion 220 calculates the signal strength I sequentially as the yaw angle φ actually changes within a range including the optimum yaw angle φopt and displays a result of the calculation sequentially on a display unit 230, as shown in FIGS. 6A and 6B. At that time, the calculation portion 220 operates as fourth calculation device 224 and obtains the optimum yaw angle φopt based on changes in the signal strength I corresponding to a plurality of yaw angles φ that are the results of the sequential calculation. Then, operating as third calculation device 223, the calculation portion 220 can recognize a current yaw angle φ with respect to the optimum yaw angle φopt and calculate a rotational direction as a guide signal that guides the yaw angle φ to the optimum yaw angle φopt. Then, based on the calculation result, as output device, the display unit 230 can display (output) the rotational direction (shown in FIGS. 6A and 6B as an outlined white arrow). As constituent elements of the second embodiment other than the above-described ones are the same as those of the first embodiment, any description for those other structural elements is omitted herein.

Therefore, in the second embodiment, the optimum yaw angle φopt is obtained by calculating the signal strength I sequentially as the yaw angle φ actually changes in the range including the optimum yaw angle φopt. As a result, it is possible to display the optimum yaw angle φopt quantitatively and to display the rotational direction of a detection head 210 toward the optimum yaw angle φopt on the display unit 230 (as shown in FIGS. 6A and 6B as the outlined white arrow). In this manner, it becomes possible to adjust the yaw angle φ without using an oscilloscope, etc. and further to adjust the yaw angle φ automatically. Note, that, although the rotational direction of the detection head 210 toward the optimum yaw angle φopt is displayed on the display unit 230 in the present embodiment, a sound may be added thereto as a guide signal, and at that time, the rotational direction need not necessarily be displayed on the display unit. Alternatively, a rotational angle itself may be displayed on the display unit.

is possible to obtain the optimum yaw angle φopt faster as a result of being able to reduce an amount of calculation required to obtain the optimum yaw angle φopt in comparison with a case in which a multidimensional function is fitted. Further, the symbol I represents I(φ) in Formula (7). In addition, a cumulative number of the symbol Σ is equivalent to a number of the plurality of points.

$$I(\varphi) = a2 \times \cos(k \times \varphi + \varphi opt) + b2 \tag{6}$$

$$\phi opt = \frac{\left(\sum \cos^2 k\phi \sum 1 - \left(\sum \cos k\phi\right)^2\right) \sum I \sin k\phi + \left(\sum \cos k\phi \sum \sin k\phi - \sum \cos k\phi \sin k\phi \sum 1\right)}{\sum I \cos k\phi + \left(\sum \cos k\phi \sin k\phi \sum \cos k\phi - \sum \cos^2 k\phi \sum \sin k\phi\right) \sum I} \tag{7}$$
$$\frac{}{(\sum \cos k\phi \sin k\phi \sum 1 - \sum \cos k\phi \sum \sin k\phi) \sum I \sin k\phi +}$$
$$((\sum \sin k\phi)^2 - \sum \sin^2 k\phi \sum 1) \sum I \cos k\phi + (\sum \cos k\phi \sum \sin^2 k\phi - \sum \cos k\phi \sin k\phi \sum \sin k\phi) \sum I$$

Further, even without having any display unit (display device) as output device, guidance may be provided by outputting a sound only.

Figure 7:
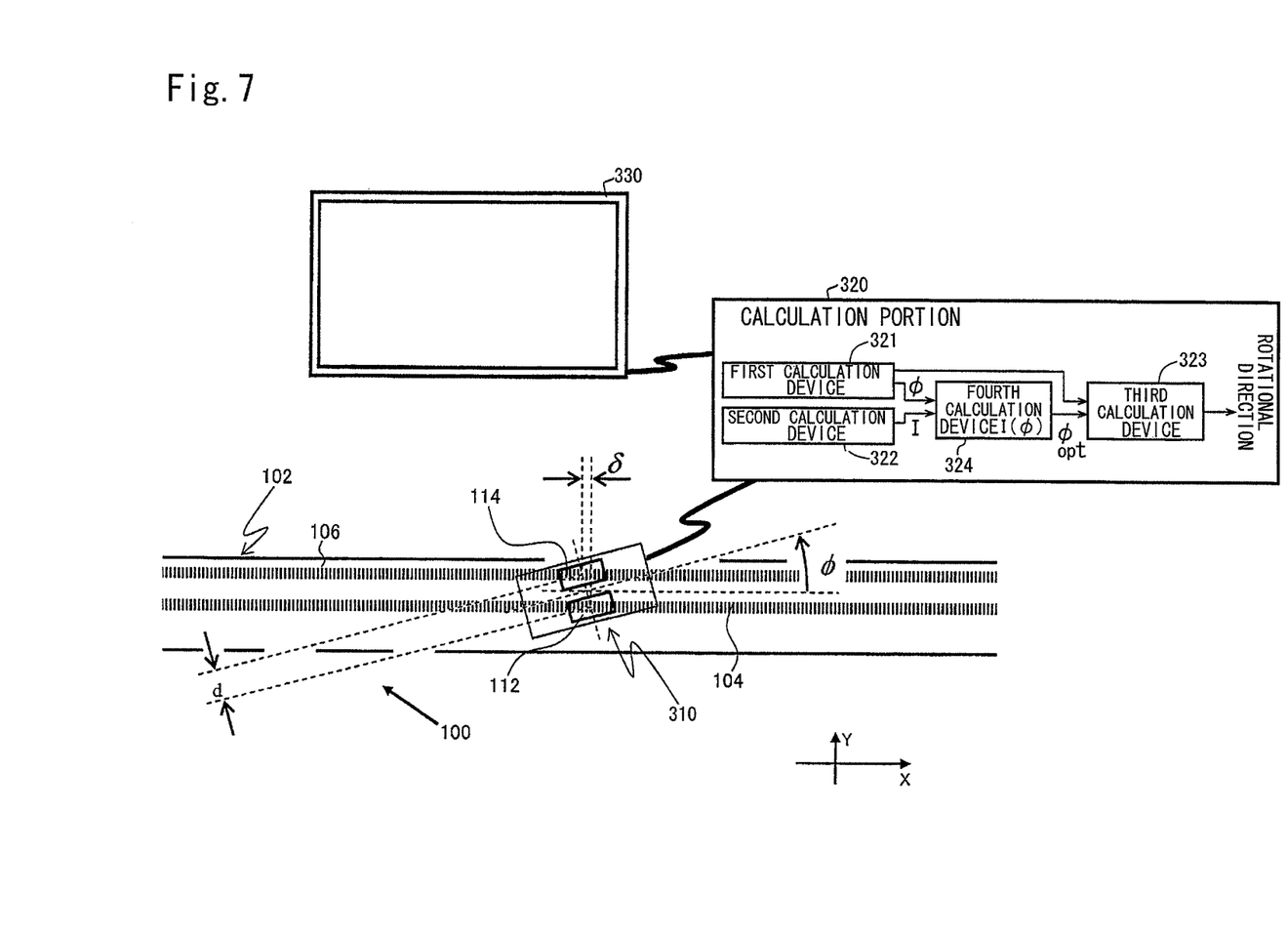
FIG. 7 is a schematic perspective view of a separate linear encoder according to a third embodiment of the present invention.

Alternatively, the present invention may be configured as in a third embodiment shown in FIG. 7.

Figure 8:
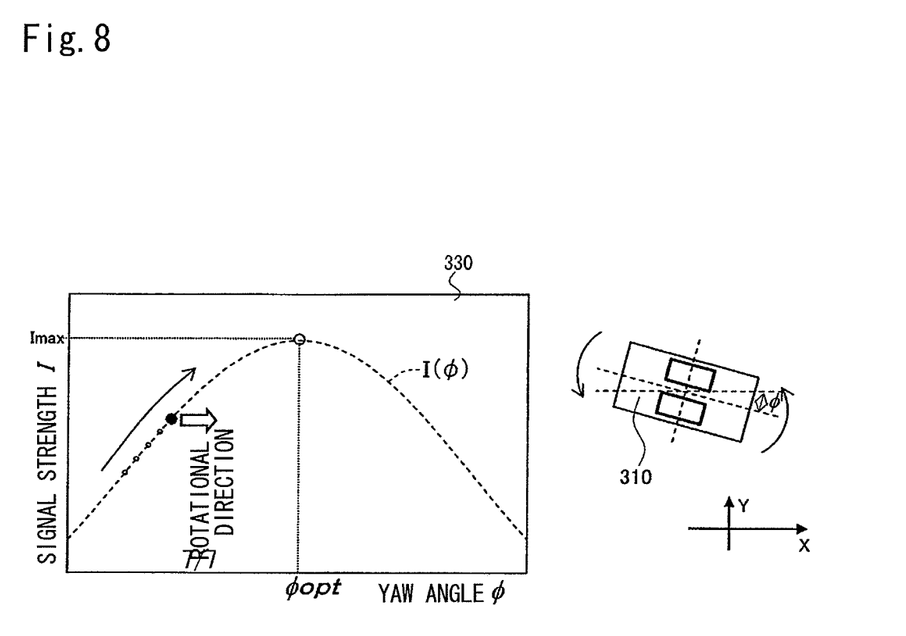
FIG. 8 is a schematic diagram showing a signal strength corresponding to a detection head and a yaw angle of the separate linear encoder according to the third embodiment of the present invention.

In the third embodiment, unlike in the second embodiment, it is not necessary to actually change the yaw angle φ within the range including the optimum yaw angle φopt, and changes in the signal strength I are obtained by fitting a function I(φ) while using a plurality of actual changes in the yaw angle φ. Then, as fourth calculation device 324, a calculation portion 320 can obtain the optimum yaw angle φopt based on the changes in the signal strength I (that are obtained by the above-described fitted function) corresponding to a plurality of yaw angles φ. More specifically, as shown in FIG. 8, when there are a plurality of actually calculated signal strengths I, a function that passes through the plurality of points, namely, a signal strength I(φ) that is shown as a dashed line in FIG. 8, can be obtained by using the least squares method, for example (other solutions may be used to fit the function).

Here, the fitted function may be a multidimensional function or a trigonometric function, for example (other functions may also be fitted). When a quadratic function, which represents the multidimensional function, is fitted, coefficients a1 and b1 shown in Formula (3) are obtained by the least squares method while using three or more coordinates (note that c1 is also a coefficient). Then, when the result is substituted into Formula (4), the optimum yaw angle φopt can be obtained as shown in Formula (5). The symbol Iφ represents I(φ) in Formula (5). Further, a cumulative number of the symbol Σ is equivalent to the number of the plurality of points.

Note that, as constituent elements of the third embodiment other than the above-described ones are the same as those of the second embodiment, descriptions for those other structural elements are omitted herein.

Therefore, in the third embodiment, it is not necessary to actually change the yaw angle φ within the range including the optimum yaw angle φopt, and changes in the signal strength I are obtained by fitting the function I(φ) while using a plurality of actual changes in the yaw angle φ. Hence, compared with the above-described embodiments, it is possible to perform guidance of the rotational direction (an outlined white arrow in FIG. 8) faster, and consequently, it is expected to make the adjustment of the yaw angle φ more rapid. At that time, the more points of the signal strength I that are actually calculated, the more it is possible to accurately obtain the optimum yaw angle φopt on the function I(φ) that indicates the signal strength I. Note that, although the rotational direction of a detection head 310 is also displayed on a display unit 330 in the present embodiment, a sound may be added thereto as a guide signal, and at that time, the rotational direction need not necessarily be displayed on a display unit. Alternatively, a rotational angle itself may be displayed on the display unit. Further, even without having any display unit (display device) as output device, guidance may be provided by outputting a sound only.

Although the calculation portion functions as the first to fourth calculation device in the above-described embodiments, the first to fourth calculation device may function separately instead of being integrated as the calculation portion.

$$I(\varphi) = a1 \times \varphi^2 + b1 \times \varphi + c1 \tag{3}$$

$$\varphi opt = -b1 / (2 \times a1) \tag{4}$$

$$\phi opt = \frac{\left(\left(\sum \phi \sum \phi^4 - \sum \phi^2 \sum \phi^3\right) \sum I + \left(\sum \phi^2 \sum \phi^2 - \sum 1 \sum \phi^4\right) \sum I\phi + \right)}{\left(\sum I \sum \phi^3 - \sum \phi^1 \sum \phi^2\right) \sum I\phi^2}{2\left[\begin{array}{c}(\sum \phi \sum \phi^3 - \sum \phi^2 \sum \phi^2) \sum I + \\ (\sum \phi \sum \phi^2 - \sum 1 \sum \phi^3) \sum I\phi + (\sum 1 \sum \phi^2 - \sum \phi^1 \sum \phi^1) \sum I\phi^2\end{array}\right]} \tag{5}$$

Further, when a trigonometric function is fitted, again by using three or more coordinates, a coefficient k shown in Formula (6) is obtained by the least squares method (note that a2 and b2 are also coefficients). Then, the optimum yaw angle φopt can be obtained as shown in Formula (7). In this case, it Further, although the separate linear encoder 100 is a reflection photoelectric linear encoder in the above-described embodiments, as shown in FIG. 1, the present invention is not limited thereto. For example, the separate linear encoder 100 may be a transmission photoelectric linear encoder. Alternatively, the separate linear encoder 100 may be one of encoders having other types of detection methods such as a magnetic encoder or a capacitance encoder having a periodic electrode pattern and an electromagnetic induction encoder having a periodic coil pattern.

The present invention is a separate linear encoder that is assembled in machinery or equipment to be measured in a state in which a scale and a detection head are separately provided. The present invention can be widely applied to such encoders as a photoelectric encoder, a magnetic encoder, a capacitance encoder and an electromagnetic induction encoder.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A separate linear encoder comprising:
a scale provided with a main track;
a detection head including a main detection portion to read the main track, and being relatively movable to the scale;
an angle detection track arranged in parallel with the main track on the scale,
an auxiliary detection portion to read the angle detection track, included in the detection head;
a first calculation device to obtain a yaw angle of the detection head with respect to the scale based on a gap between the main detection portion and the auxiliary detection portion, and based on a difference amount between a position value of the main track detected by the main detection portion and a position value of the angle detection track detected by the auxiliary detection portion;
a second calculation device to obtain a signal strength based on an output signal from the main detection portion; and
a display device to display relationships between a plurality of yaw angles and signal strengths corresponding to the respective yaw angles.

2. The separate linear encoder according to claim 1, wherein the main track is an incremental (INC) track, and the angle detection track is an absolute (ABS) track.

3. The separate linear encoder according to claim 1, wherein the main track and the angle detection track each are an incremental (INC) track.

4. A separate linear encoder comprising:
a scale provided with a main track;
a detection head including a main detection portion to read the main track, and being relatively movable to the scale,
an angle detection track arranged in parallel with the main track on the scale,
an auxiliary detection portion to read the angle detection track, included in the detection head,
a first calculation device to obtain a yaw angle of the detection head with respect to the scale based on a gap between the main detection portion and the auxiliary detection portion, and based on a difference amount between a position value of the main track detected by the main detection portion and a position value of the angle detection track detected by the auxiliary detection portion;
a second calculation device to obtain a signal strength based on an output signal from the main detection portion;
a third calculation device to recognize a current yaw angle with respect to an optimum yaw angle at which the signal strength reaches a maximum level and calculates a guide signal that guides the current yaw angle to the optimum yaw angle; and
an output device to output the guide signal.

5. The separate linear encoder according to claim 4, further comprising a fourth calculation device to calculate the optimum yaw angle based on changes in the signal strengths corresponding to the plurality of yaw angles.

6. The separate linear encoder according to claim 5 wherein the changes in the signal strengths are obtained by fitting a function.

7. The separate linear encoder according to claim 6, wherein the function is a multidimensional function.

8. The separate linear encoder according to claim 6, wherein the function is a trigonometric function.

9. The separate linear encoder according to claim 4, wherein the guide signal is output as a sound.

10. The separate linear encoder according to claim 4, further comprising display device to display relationships between the plurality of yaw angles and the signal strengths corresponding to the respective yaw angles.

* * * * *